United States Patent [19]

Merkle

[11] 4,200,270
[45] Apr. 29, 1980

[54] PNEUMATIC SPRING, ESPECIALLY FOR VEHICLES

[75] Inventor: Josef Merkle, Esslingen, Fed. Rep. of Germany

[73] Assignee: Daimler-Benz Aktiengesellschaft, Fed. Rep. of Germany

[21] Appl. No.: 959,800

[22] Filed: Nov. 13, 1978

[30] Foreign Application Priority Data

Nov. 12, 1977 [DE] Fed. Rep. of Germany ....... 2750666

[51] Int. Cl.² ............................................. F16F 3/08
[52] U.S. Cl. ................................................ 267/65 B
[58] Field of Search ................... 267/65 R, 65 B, 118, 267/121, 122

[56] References Cited

U.S. PATENT DOCUMENTS

| 3,046,003 | 7/1962 | Schultz | 267/65 B |
| 3,627,297 | 12/1971 | Gaydecki | 267/65 B |

Primary Examiner—Duane A. Reger
Attorney, Agent, or Firm—Craig & Antonelli

[57] ABSTRACT

A pneumatic spring for vehicles which spring includes two supports as well as at least one closed spring volume and two differently sized spring areas which are subjected to a pressure acting in opposite directions. The two spring surfaces are separated from one another and are variable in size as a function of the travel of the pneumatic spring, two roll bellows are arranged in a casing of the pneumatic spring with opposite spring surfaces of the bellows being supported upon connected spring pistons. The supports are formed, on the one hand, by the spring pistons and, on the other hand, by a casing associated with the walls of the roll bellows. Partial volumes are defined by the roll bellows with the partial volumes being separated from one another so as to maintain the respective volumes essentially independent of the travel of the pneumatic spring.

51 Claims, 4 Drawing Figures

FIG I

PNEUMATIC SPRING, ESPECIALLY FOR VEHICLES

The present invention relates to a pneumatic or air spring for motor vehicles which includes two supports, a closed spring volume, and two coaxially supported spring surfaces of different sizes which are subjected to a compression or compressor stress in opposite directions with the spring surfaces acting opposite to one another and varying in effective size as a function of travel of the spring.

A pneumatic or air spring of the aforementioned type is proposed in, for example, German Pat. No. 1,021,733, wherein two pleated bellows, which act against one another, are provided between which a support is provided and a frame is disposed which forms an auxiliary air volume with the second support being associated with the frame. The two pleated bellows, at sides located away from the first support, are connected to the frame as auxiliary air volumes so as to form a closed spring volume with the auxiliary air volume associated with the frame. Disadvantages of a spring volume of this type reside in the fact that a corresponding dynamization of the entire auxiliary air volume during dynamic operation is produced, depending upon the volumes of the pleated bellows, whereby corresponding phase shifts and inertias develop. Moreover, in this proposed construction, it is possible for the supporting capacity of the spring to be increased by increasing the filling pressure thereof; however, increasing the filling pressure, which applies to the entire system, necessarily always results in a quite specific spring characteristic.

The aim underlying the present invention essentially resides in providing a pneumatic or air spring which provides for a zero-delayed response and wherein the spring characteristic may be changed independently of the supporting capacity of the spring in question.

According to advantageous features of the present invention, the pneumatic or air spring includes two roll bellows each having an effective spring surface with spring pistons supporting at least portions of the roll bellows on surfaces thereof facing away from each other. The spring pistons are connected to each other and the supports of the pneumatic springs are formed, on the one hand, by the spring pistons and, on the other hand, by a casing associated with the roll bellows walls. The two roll bellows define partial volumes of the total volume of the pneumatic spring with the partial volumes being separated from one another for the purpose of maintaining such volumes in a manner which is essentially independent of the travel of the springs.

By virtue of the features of the present invention, it is possible to construct a spring which functions essentially independently for supporting strength, spring travel behavior, and tilting spring behavior, and also to provide the best possible spring characteristic for various applications. These advantages are achieved with a pneumatic spring having a simple construction and a relatively small structural size with the relatively small required size of the spring simultaneously ensuring a rapid response of the pneumatic springs. Additionally, an advantageous effect upon the control and regulation possibilities is realized by the present invention. Moreover, the pneumatic spring of the invention provides advantages with respect to the accepting forces since a favorable position of the supports is made possible.

In accordance with further advantageous features of the present invention, the partial volumes may be separated by a wall or partition member associated with one of the supports, preferably, the casing with the wall or partition member being made both rigid and also at least partially flexible as, for example, a membrane or diaphragm. If the wall or partition member is made rigid, pressure changes in the partial volumes act only on that specific partial volume and mutual influences based on the total spring volume are eliminated. Consequently, pressure changes produce a significant counter spring stiffening or hardening which is significant with respect to a nominal or normal position of the pneumatic spring.

If the wall or partition member is made flexible, the counter spring stiffening or hardening is initially gradually delayed and then increases and achieves a maximum hardening or stiffening only when the flexibility of the wall or partition member has been utilized to the fullest.

With at least partially elastic walls or partition members, a stiffening or hardening of the counter spring as a function of spring travel may be achieved in accordance with the present invention by providing a central fastening between the oppositely disposed spring pistons with the central fastening being connected to the at least partially flexible or elastic partition member or wall. By virtue of this construction, if a certain stiffening or hardening is produced by a tensioning of the wall or partition member fashioned as, for example, a diaphragm, a change in pressure will result in a corresponding increase in the counter spring stiffening or hardening. Thus, an appropriately softer response than that obtained toward end positions of the travel path of the spring may be provided with respect to the normal spring position.

In accordance with still further features of the present invention, the central fastening may include a tie rod for connecting the spring pistons whereby, with a relatively rigid elastic wall or partition member, located opposite the tie rod, an auxiliary spring function may also be performed by the wall or partition member and also contribute to a centering of the central fastening and radial support thereof with respect to the casing of the spring.

Advantageously, according to the present invention, supply connections are in communication with the partial volumes which supply connections may either be disposed centrally of the spring by, for example, being associated with the central fastening, or also be associated with the casing of the spring.

The central fastening of the present invention in its simplest form may, as noted above, be constructed merely as a tie rod for connecting the spring pistons together with the rod being advantageously located in a spacing sleeve which determines or defines the distance between the spring pistons. However, it is also possible in accordance with the present invention to construct the central fastening as a guide tube which accommodates a rod guided therein in a telescopic manner, with the guide tube and the rod each being respectively associated with the supports of the pneumatic spring so that the supports are mounted coaxially with respect to each other.

With the above telescopic construction of the guide tube and rod, it is assumed that only telescopic extensibility and compressibility are provided; however, according to the present invention, the central fastening may also be in the form of a vibration damper such as, for example, a hydraulic shock absorber, with a casing tube of the shock absorber being associated with one of the supports and the piston rod of the shock absorber being associated with the other spring support.

In accordance with the present invention, the wall or partition member may be constructed so as to not be flexible or may be flexible for at least a portion of its area. Additionally, the wall or partition member may be made so as to at least be partially elastic. If the partition member or the wall is constructed so as to be at least partially flexible, the partition may be in the form of an auxiliary spring.

In accordance with the present invention, the partition member or wall is arranged so as to be longitudinally displaceable relative to the central fastening with the partition member having an essentially center or middle position relative to the casing when the pneumatic spring is in a normal position.

For the purpose of guiding the roll bellows, the casing may include a number of sleeve guide means with at least one of the sleeve guide means tapering conically over at least a portion of its length in a direction of an associated spring piston.

Additionally, in accordance with the present invention, the spring pistons have different diameters with a guide sleeve means associated with the spring piston having the smaller diameter being provided with a sealing bell operatively connected with one of the supports of the pneumatic spring. The sealing bell defines a chamber which is provided with appropriate ventilating means. The chamber is arranged such that during a path of travel of the pneumatic spring, air contained in the chamber is pumped out and may be directed so as to cool the exterior of the pneumatic spring.

In accordance with still further features of the present invention, at least one of the spring pistons is closed off so as to define an auxiliary spring volume which is adapted to be in communication with one of the partial volumes delimited by the bellows.

Accordingly, it is an object of the present invention to provide a pneumatic spring which avoids, by simple means, shortcomings and disadvantages encountered in the prior art.

Another object of the present invention resides in providing a pneumatic spring having spring characteristics which may be changed independently of the supporting capacity of the spring.

Another object of the present invention resides in providing a pneumatic spring which has a relatively small structural size and which provide for a zero delay response.

A further object of the present invention resides in providing a pneumatic spring which is simple in construction and therefore inexpensive to manufacture.

Another object of the present invention resides in providing a pneumatic spring which is readily adaptable to various differing environments.

These and other objects, features, and advantages of the present invention will become more apparent from the following description taken in connection with the accompanying drawings which show, for the purposes of illustration only, several embodiments in accordance with the present invention, and wherein.

Figure 3:
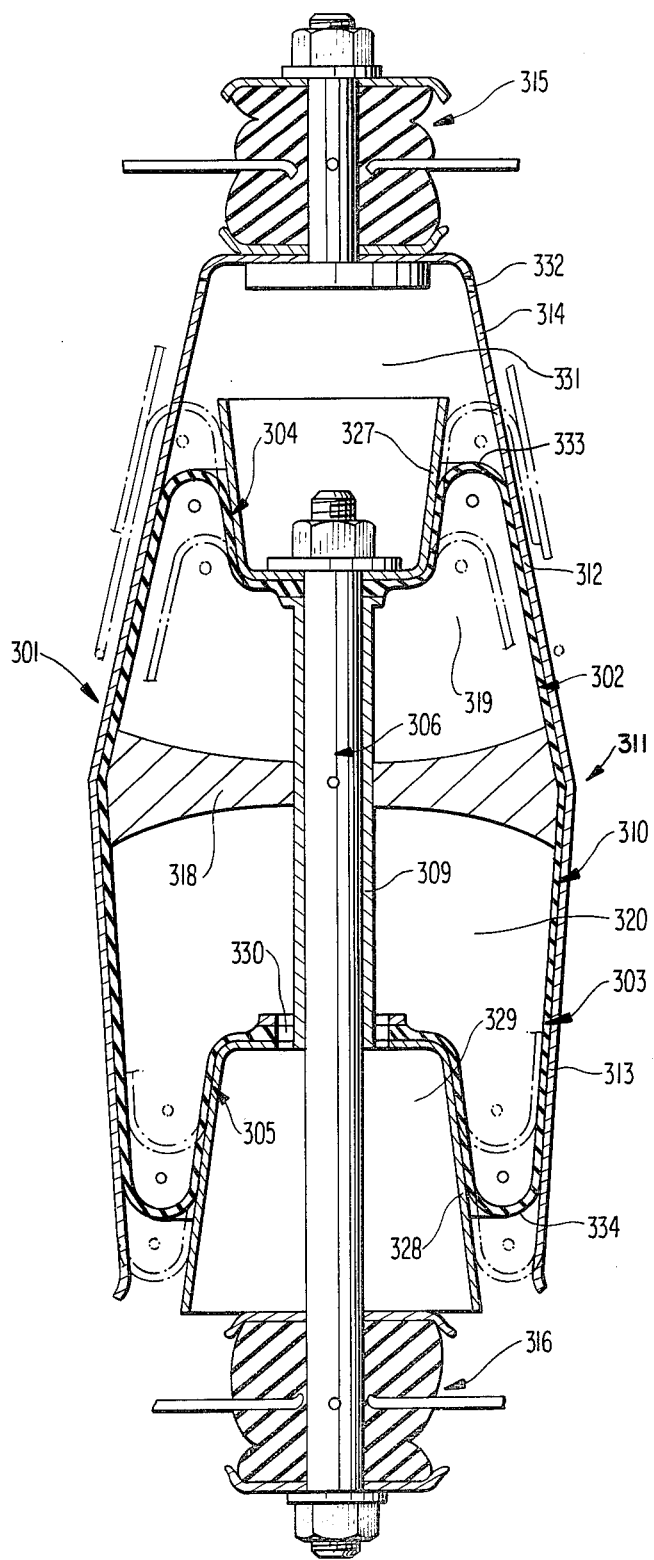
Figure 4:
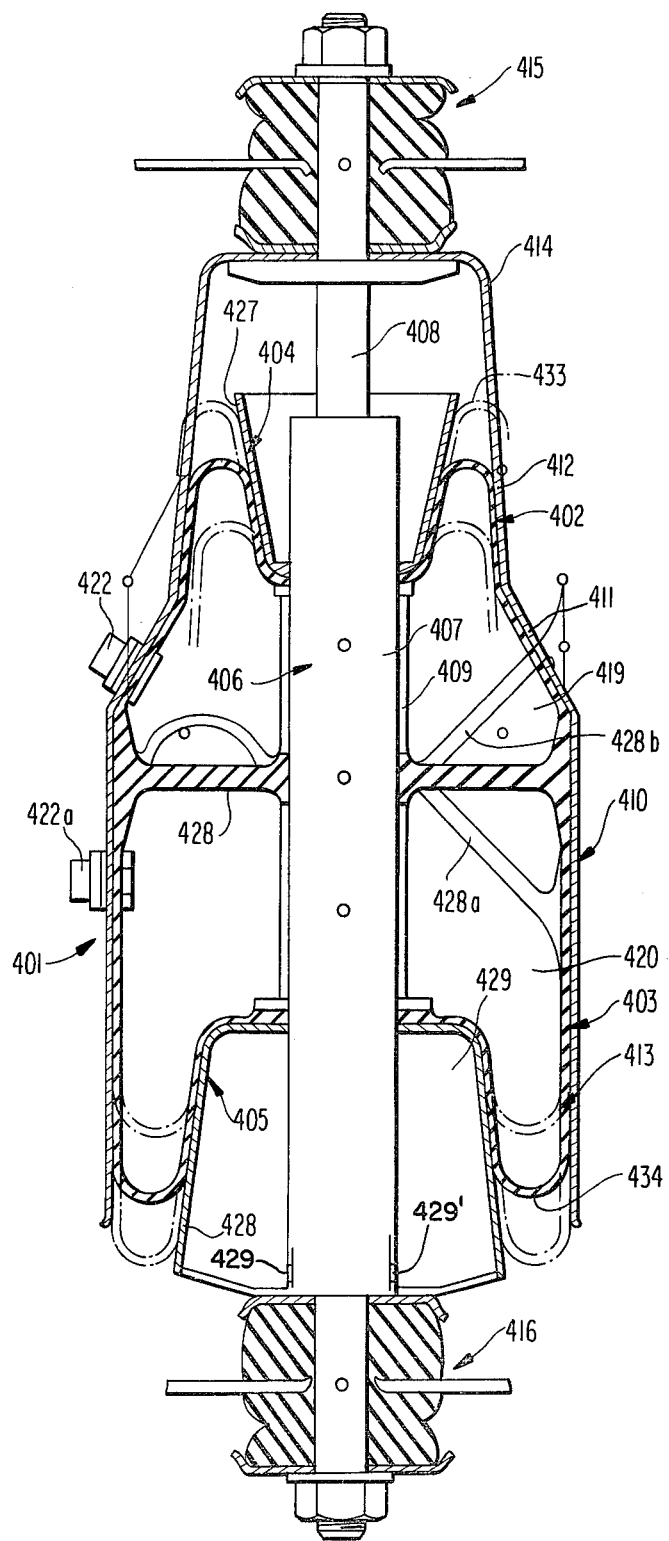

FIG. 3 is a longitudinal cross-sectional view of a further embodiment of a pneumatic spring in accordance with the present invention with a diaphragm-like partition being disposed between the two partial volumes associated with the roll bellows; and FIG. 4 is a longitudinal cross-sectional view of yet another embodiment of a pneumatic spring in accordance with the present invention with the partition between the two partial air volumes associated with the roll bellows being formed by a highly elastic diaphragm.

Figure 1:
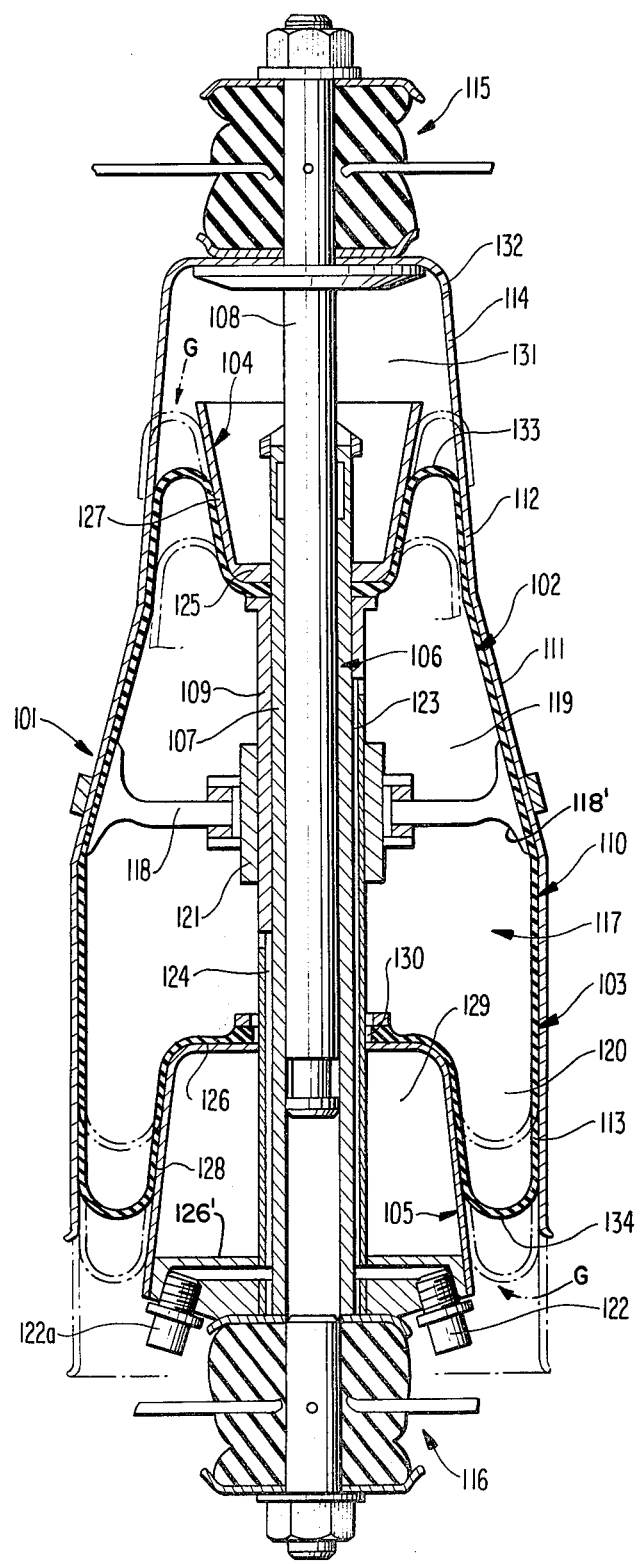
FIG. 1 is a longitudinal cross-sectional view of a pneumatic spring in accordance with the present invention with two partial volumes associated with roll bellows being separated by a fixed partition member.

Referring now to the drawings for in like reference numerals are used throughout the various view to designate like parts and, more particularly, to FIG. 1 according to this figure, an air spring generally designated by the reference numeral 101, in a highly schematic and simplified form, is provided which includes two roll bellows generally designated by the reference numerals 102, 103 disposed coaxially opposite each other with each of the bellows being respectively supported on the cup-shaped spring piston generally designated by the reference numerals 104, 105 with the supporting effective areas of the spring pistons 104, 105 being adjustable or variable as a function of spring travel, that is, the amount of supporting surface of the pistons 104, 105 varies with the compression or extension of the spring 101. In the illustrated embodiment of FIG. 1, the spring piston 104 has a smaller diameter or effective surface than the spring piston 105.

A tie rod generally designated by the reference numeral 106 is provided for connecting the spring pistons 104, 105. The tie rod 106 is of a telescopic construction and includes a casing tube 107 fastened with respect to the spring pistons 104, 105 and an extensible piston rod 108 which is lengthwise displaceably guided in the casing tube 107. The spacing sleeve 109 surrounds the casing tube 107 in an area between the spring pistons 104, 105.

A casing generally designated by the reference numeral 110 externally surrounds the roll bellows 102, 103 with the casing 110 including a conical casing ring 111 in a central lengthwise area of the spring 101, an upper guide sleeve 112, and a lower guide sleeve 113. The conical casing ring 111 tapers inwardly in a direction toward the smaller spring piston 104. An upper end of the casing ring 111 abuts the sleeve 112 with the sleeve 113 abutting the lower end of the casing ring 111. The sleeves 112, 113, together with the conical casing ring 111, form the external guidance and support for the roll bellows 102, 103. The upper portion of the sleeve 112, associated with the smaller spring piston 104, is provided with a sealing bell portion 114, which fits over the spring piston 104. The bell portion 114 is firmly connected to the piston rod 108 which, in turn, is connected with one support generally designated by the reference numeral 115. The support 115 of the pneumatic spring 101 is disposed exteriorly of the bell portion 114. A second support generally designated by the reference numeral 116 is disposed coaxially with respect to the first support 115. The second support 116 is located on an opposite side of the pneumatic spring 101 axially outside the spring piston 105 at the corresponding end of the casing tube 107.

The two roll bellows 102, 103 completely enclose a main spring chamber generally designated by the reference numeral 117 with a partition member 118 subdividing the chamber 117 into two partial spring volumes 119, 120 each associated with a respective roll bellows 102, 103. The partition member 118 is made rigid and connected to the casing 110 in a vicinity of the conical casing ring 111 by suitable fastening means. For this purpose, in the connecting area of the partition member 118, an expanded mounting flange 118′ is provided. The partition 118 is provided with an opening in a central area thereof for enabling the spacer sleeve 109 and/or the tie rod 106 to pass therethrough. An O-ring 121 is arranged in the central area of the partition member 118 radially inwardly and internally of the mounting flange 118′. The O-ring 121 abuts the outer surface of the spacing sleeve 109 in an air-tight manner and is lengthwise displaceable in the length direction in the spacing sleeve 109. On the whole, the partition 118, depending upon the amount of spring travel, is displaceable lengthwise with respect to the spacing sleeve 109 and/or tie rod 106. To prevent the O-ring 121 from jamming by tilting or the like, as shown in FIG. 1, the O-ring 121 is preferably connected with the partition member 118 in a floating manner.

Pneumatic supply connections 122, 122a are provided for permitting the introduction of a filling pressure into the partial spring volumes 119, 120, whereby the supporting force and the counter-spring hardening of the spring 101 may be controlled. For this purpose, the supply connection 122 is connected by way of a line or conduit 123 to the partial spring volume 119 and the supply connection 122a is connected by way of a connecting line or conduit 124 to the partial spring volume 120.

The spring pistons 104, 105 have an essentially cup-shaped configuration and expand or taper outwardly with conical walls 127, 128 extending from the bottom walls or surfaces 125, 126 through which walls the tie rod 106 extends. The taper or tilt angle of the walls 127, 128 determine the magnitude of the rolling cone for the roll bellows 102, 103. The size of the effective spring surface of the roll bellows 102, 103 as well as the change in such surface can be determined over the spring travel distance by the taper or tilt angle of the walls 127, 128 in conjunction with a taper or tilt of the guide sleeves 112, 113 which surround the roll bellows 102, 103 in the vicinity of the spring pistons 104, 105. The essentially cup-shaped spring pistons 104, 105 are respectively disposed within the guide sleeves 112, 113. An annular groove generally designated by the reference character G is defined between the inner surface of the respective guide sleeves 112, 113 and an outer surface of the associated cup walls 127, 128.

An auxiliary spring volume 129 may be formed out of a significant portion of an interior space of the larger spring piston 105. For this purpose, an additional wall 126′ may be provided for closing the end of the spring piston 105. The auxiliary spring volume 129 may be in communication with the partial spring volume 120 by way of at least one hole or aperture 130 provided in the bottom wall 126. By virtue of the auxiliary volume 129, it is possible to indirectly increase the total volume for the spring 101.

The sealing bell portion 114 externally covers the smaller of the spring pistons 104 so as to essentially define a chamber 131 between the bell portion 114 and spring piston 104. The chamber 131 has a volume which varies as a function of spring travel. The variation in the volume of the chamber 131 can be effectively utilized so as to produce a flow of, for example, cooling air which air may be guided or directed along an outside surface of the casing 110. For this purpose, a casing cover (not shown) may be arranged on the spring so as to guide the air from the chamber outwardly along the outer surface of the casing 110. In order to provide a necessary pumping action of the air from the chamber 131, ventilating bores or openings 132 are provided in the bell portion 114.

The roll bellows loops 133, 134 of the roll bellows 102, 103 are accommodated in the annular grooves G. During a travel of the spring, the roll bellows travel or are displaced in an area between the outer surfaces of the spring pistons 104, 105 and the inner surfaces of adjacent parts of the casing 110, namely, inner surfaces of the guide sleeves 112, 113. As a result of the mutual travel or displacement of the roll bellows loops 133, 134 during spring travel between the outer surfaces of the walls 127, 128 of the spring pistons 104, 105 and the inner surfaces of the guide sleeves 112, 113, it is possible to at least essentially compensate for changes in partial spring volumes 119, 120 caused by the displacement of the partition member 118 by appropriate changes in the shape of the roll bellows loops 133, 134. With a given or initially set volume for the partial volumes 119, 120 such given or set volume is essentially retained over the spring travel distance so that no pressure changes occur which could result in changes in the spring characteristic. However, by virtue of the present invention, the spring characteristic of the spring 101 may be deliberately changed by supplying additional air to the partial volumes 119, 120 through supply connections 122, 123 but mutual influences of the respective partial volumes 119, 120 are practically ruled out by virtue of the absolute separation produced by the partition member 118.

Figure 2:
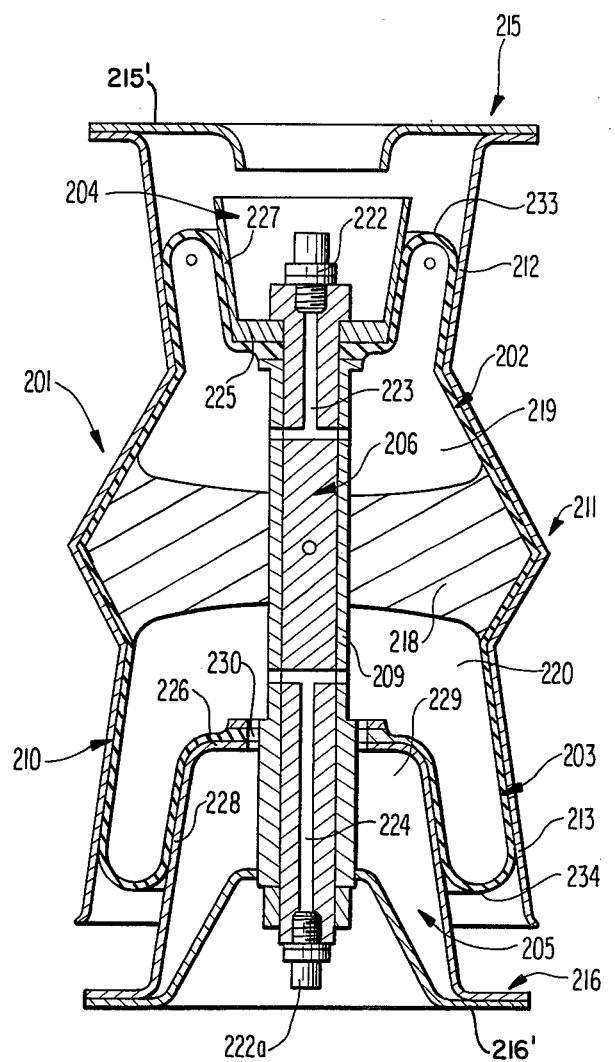
FIG. 2 is a longitudinal cross-sectional view of another embodiment of a pneumatic spring in accordance with the present invention with the two partial volumes being separated by an essentially rigid partition constructed of an elastic material.

FIG. 2 provides another example of a pneumatic spring which, in terms of theoretic construction and the nature of operation, corresponds to the pneumatic spring 101 of FIG. 1. Accordingly, the reference numerals in FIG. 2 for the corresponding parts in the two spring constructions have been increased by 100.

As shown in FIG. 2, a pneumatic spring generally designated by the reference numeral 201 includes roll bellows generally designated by the reference numerals 202, 203, which are integrally formed, respectively resting upon spring pistons generally designated by the reference numerals 204, 205. A casing generally designated by the reference numeral 210 includes guide sleeves 212, 213 externally surrounding the spring pistons 204, 205. However, unlike the construction of FIG. 1, the guide sleeves 212, 213 extend in parallel to the side walls 227, 228 of the spring pistons 204, 205. By virtue of this arrangement, only small spring travel distances are possible and, accordingly, with a quasi-rigid construction of the partition wall member 218, only small changes in volume are possible in the corresponding partial volumes 219, 220 as a result of a displacement of the partition member 218. Moreover, something which is made possible by the construction of FIG. 2 is that, since only slight influences upon the size of the corresponding partial volumes 219, 220 are produced by the quasi-rigid partition member 218 as a function of spring travel, only correspondingly small corrections will be required on the opposite side by way of the roll bellows loops 233, 234 as a function of spring travel.

The partition member 218 is mounted relative to the casing 210 in a central region generally designated by the reference numeral 211. The casing 210 is bulged or projected outwardly to form an angle in the central region 211 so as to enable the casing 210 to be mounted firmly on the partition member 218 in the central region 211. Partition member 218 is constructed so as to have thick walls and is made of, for example, a rubber-elastic but relatively rigid material. An annular opening or aperture is provided in a central portion of the annular partition 218 with the opening being dimensioned such that the partition member 218 fits tightly against the spacing sleeve 209 of the tie rod generally designated by the reference numeral 206. The relatively thick-walled design of the partition member 218 produces a radial support between the casing 210 and the spacing tube 209 and/or tie rod 206 by way of the partition member 218. Furthermore, in a construction of the type shown in FIG. 2, the partition member 218 may also take over the function of an auxiliary spring in the axial direction.

Pneumatic supply connections 222, 222a are arranged at respective ends of the tie rod 206 and extend through the bottom walls 225, 226 of the spring pistons 204, 205 with the connections 222, 222a being secured or tensioned against the bottom walls 225, 226 by conventional means. The supply connection 222 communicates with the partial spring volume 219 by way of a connecting line or conduit 223 which extends through the tie rod 206. The supply connection 222a communicates with the partial spring volume 220 by a connecting line or conduit 224 which also extends through the tie rod 206.

The connections of the pneumatic spring 201 to the supports generally designated by the reference numerals 215, 216 are only partially illustrated in FIG. 2. On the side of the large spring piston 205, the support 216 is fashioned as a connecting cup having a radially extending mounting flange 216' with the connecting cup being connected to the tie rod 206. The second support 215 is disposed axially opposite the support 216 and is also formed as a connecting cup, similar in principle to the connecting cup of the support 216. The connecting cup of the support 215 is mounted directly on the casing 210 in a vicinity of the free end of the sleeve 212 by way of the connecting or mounting flange 215'.

A pneumatic spring in accordance with FIG. 2 is especially suited for applications in which there is only a small amount of spring travel and frequency-dependent control are involved. Accordingly, such a pneumatic spring may be used especially for motor mounts, supports for cabs, or the like.

As shown in FIG. 3, an air spring generally designated by the reference numeral 301 includes roll bellows generally designated by the reference numerals 302, 303 supported by spring pistons generally designated by the reference numerals 304, 305 with the roll bellows 302, 303 being associated with partial volumes 319, 320 delimited by a partition member 318. The partition member 318 is once again mounted firmly or immobilized with respect to the casing generally designated by the reference numeral 310 in a central area generally designated by the reference numeral 311 as well as with respect to the spacing sleeve 309. The partition member 318 is constructed from an elastic material and consists of, for example, a rubber like material. The partition member 318 has a specific shape which is determined so that a certain dish-like deformation is made possible as a function of spring travel but a pressure-dependent outward bulging of the wall is essentially prevented.

The arrangement of the partition member 318 in the manner illustrated in FIG. 3 makes the pneumatic spring suitable for relatively long spring travel but does not result in excessive changes in partial volumes 319, 320 on the partition side as a function of the spring travel so that, even with a simple shape for the casing generally designated by the reference numeral 310 which accommodates the roll bellows loops 333, 334, deformations which are a function of the spring travel may still be produced which allow the changes in partial volumes 319, 320, caused by deformation of the partition member 318, to be off set. In the pneumatic spring construction of FIG. 3, this is accomplished by means of the casing 310 in which both guide sleeves 312, 313 are made conical and tapered toward the ends of the air spring 301. In the central region 311, the sleeves 312, 313 directly abut one another so as to produce a favorable profile for the casing 310 and for the support of the partition member 318 in the middle region of the casing 310.

A tie rod generally designated by the reference numeral 306 is provided within the spacing sleeve 309 with the tie rod passing through the larger of the spring pistons 305 and carrying a support generally designated by the reference numeral 316 outside of the spring piston 305. On an opposite side, a sealing bell 314 fits against the guide sleeve 312 with ventilating bores or openings 332 being provided in the sealing bell 314 for communicating the interior chamber 331 of the bell 314 with the atmosphere. The sealing bell 314 is associated with the support generally designated by the reference numeral 315 which is disposed coaxially with the support 316.

As shown in FIG. 4, a pneumatic spring generally designated by the reference numeral 401 includes a casing generally designated by the reference numeral 410 having two sleeves 412, 413 connected by an annular central casing ring 411 which is fashioned as a conical ring tapering toward the smaller spring piston generally designated by the reference numeral 404.

The spring piston 404 is connected with the opposite spring piston generally designated with the reference numeral 405 by a casing tube 407 disposed within a spacer sleeve 409. A piston (not shown) of a hydraulic two chamber shock absorber is guided in the casing tube 407 with the piston rod 408 of the shock absorber being connected with the sealing bell 414 and carrying the support generally designated by the reference numeral 415. The second chamber of the hydraulic shock absorber is located outside of the shock absorber and is formed by an enclosed internal chamber 429 of the large spring piston 405. The second support 416 is connected with the casing tube 407 and is disposed coaxially opposite the first support 415. Suitable bores 429' or the like are provided for communicating the interior of the chamber 429 with the hydraulic shock absorber.

The roll bellows generally designated by the reference numerals 402, 403 once again with their roll bellows loops 433, 434, form a transistion between the walls 427, 428 of the spring pistons 404 and 405 and the corresponding wall areas of the guide sleeves 412, 413 with the guide sleeve 412 making a transistion to the sealing bell 414.

Partial volumes 419, 420, associated with the roll bellows 402, 403, are separated from one another by a partition 428 which is firmly anchored and extends between casing 410 and spacing tube 409, opposite these two parts. The partition member 428 is made essentially in the form of a relatively thin-walled membrane which allows an ultimate pressure action between the two partial volumes 419, 420 causing a bulging of the membrane whereby a soft springing action is produced with respect to the normal position of the spring. Additionally, this construction results in a volume balancing in a vicinity of the normal spring position so that no larger volume changes in the partial volumes 419, 420 need be offset by the roll bellows loops 433, 434 with respect to the normal position of the pneumatic spring 401.

For a longer spring travel, the membrane-type partition 428, as indicated schematically at 428a, 428b is tensioned to the point where the membrane acts essentially as a rigid partition member as a result of which, toward the end positions of the spring travel, the volume between the two partial volumes 419, 420 can no longer be offset by means of the partition member 428 and the spring characteristic of the pneumatic spring 401 is markedly stiffened or hardened.

Supply connections 422, 422a are provided and mounted directly in the casing 410 with the supply connections 422, 422a terminating directly in corresponding partial volumes 419, 420. A corresponding arrangement of supply connections is also possible in the construction shown, for example, in FIG. 3.

By use of a partition member 428 constructed as a membrane-type partition, it is possible to influence the stroke frequency of the pneumatic spring 401 in such a manner that one of the partial chambers 419 or 420 is subjected to higher pressure with respect to the normal position of the pneumatic spring 401 thereby resulting in a bulging of the membrane toward the other side until a pressure balance has been established so that the differential initial pressure produces displacements in the sizes of the partial volumes 419, 420. As a result, if provision is made to increase the volume on the side of the larger spring piston 405, partial volume 420 of the support spring, for example, will be increased and the springing action of the pneumatic spring 401 will be made softer.

While I have shown and described several embodiments in accordance with the present invention, it is understood that the same is not limited thereto, but is susceptible of numerous changes and modifications as known to one having ordinary skill in the art and I therefore do not wish to be limited to the details shown and described herein but intend to cover all such modifications as are encompassed by the scope of the appended claims.

I claim:

1. A pneumatic spring for vehicles which includes two supports, at least one closed spring volume, two spring surfaces of different sizes adapted to be subjected to pressure acting in opposite directions, the two spring surfaces each having an effective spring surface which is variable in size as a function of travel of the pneumatic spring, and means for supporting the spring surfaces so as to be coaxial with respect to one another, characterized in that a casing is provided, two roll bellows means are arranged in the casing and form the spring surfaces, each of the roll bellows means defining a partial volume of the at least one closed spring volume, the supporting means includes a pair of spring piston means associated with the respective roll bellows means, the spring piston means and the casing of the pneumatic spring form at least a portion of the two supports, and in that means are provided for separating the partial volumes defined by the two roll bellows means from each other so as to maintain the respective partial volumes essentially independent of the travel of the pneumatic spring.

2. A pneumatic spring according to claim 1, characterized in that the separating means includes a partition member connected to one of the supports.

3. A pneumatic spring according to claim 2, characterized in that the partition member is connected to the casing.

4. A pneumatic spring according to claim 2, characterized in that the partition member is inflexible.

5. A pneumatic spring according to claim 2, characterized in that the partition member is flexible over at least a portion thereof.

6. A pneumatic spring according to claim 2, characterized in that the partition member is constructed so as to be at least partially elastic.

7. A pneumatic spring according to claim 2, characterized in that the partition member is constructed as a membrane.

8. A pneumatic spring according to one of claim 6 or 7, characterized in that the partition member is in the form of an auxiliary spring.

9. A pneumatic spring according to one of claim 5, 6, or 7, characterized in that a central fastening means is provided for connecting the spring means to each other, and in that the partition member is firmly supported with respect to the fastening means and the casing.

10. A pneumatic spring according to claim 9, characterized in that the partition member is displaceable and is disposed in a central position of the casing when the pneumatic spring is in a normal position.

11. A pneumatic spring according to one of claim 4, 5, or 7, characterized in that means are provided for varying the supporting force and counter spring hardening of the pneumatic spring.

12. A pneumatic spring according to claim 11, characterized in that said last mentioned means includes connection means for permitting a pneumatic fluid to be supplied to the respective partial volumes associated with the two roll bellows means.

13. A pneumatic spring according to claim 12, characterized in that the connection means includes separate supply conduits communicating with the respective partial volumes.

14. A pneumatic spring according to claim 13, characterized in that the connection means is disposed at one of the two supports.

15. A pneumatic spring according to claim 14, characterized in that a central fastening is provided for connecting the spring piston means to each other, and in that the partition member is firmly supported with respect to the fastening means and the casing.

16. A pneumatic spring according to claim 15, characterized in that the connection means is disposed centrally of the casing in the central fastening means.

17. A pneumatic spring according to claim 16, characterized in that the two roll bellows means are made integrally in one piece.

18. A pneumatic spring according to claim 17, characterized in that the casing includes at least two coaxial sleeve guide means each associated with one of the two roll bellows means and the spring piston means.

19. A pneumatic spring according to claim 18, characterized in that at least one of the sleeve guide means tapers conically at least over a portion of an axial length thereof in a direction toward the spring piston means associated therewith.

20. A pneumatic spring according to one of claims 4 or 5, characterized in that the casing includes at least two coaxial sleeve guide means each associated with one of the roll bellows means and the spring piston means.

21. A pneumatic spring according to claim 20, characterized in that the guide sleeve means associated with the roll bellows means having a smaller of the effective spring surfaces includes a sealing bell associated with one of the two supports.

22. A pneumatic spring according to claim 21, characterized in that the sealing bell defines an air chamber, and in that means are provided for venting the air chamber to the atmosphere.

23. A pneumatic spring according to claim 22, characterized in that the air chamber is disposed in such a manner that a displacement of the pneumatic spring results in a pumping of air from the air chamber with the air chamber defining a pump volume.

24. A pneumatic spring according to one of claim 4, 5, or 7, characterized in that the spring piston means have an open cup-shaped configuration, and in that means are provided for closing one of said spring piston means so as to define an auxiliary spring volume.

25. A pneumatic spring according to claim 24, characterized in that means are provided for communicating the auxiliary spring volume with the at least one closed spring volume.

26. A pneumatic spring according to one of claim 4 or 7, characterized in that the central fastening means includes a tube.

27. A pneumatic spring according to claim 26, characterized in that a guide rod means is displaceably guided in said tube, one of the two supports being operatively connected with said guide rod means and the other support being operatively connected with said tube.

28. A pneumatic spring according to claim 26, characterized in that the tube forms a casing tube of a vibration damper.

29. A pneumatic spring according to claim 28, characterized in that the vibration damper is constructed as a hydraulic shock absorber.

30. A pneumatic spring according to claim 7, characterized in that means are provided for varying the supporting force and counter-spring hardening of the pneumatic spring.

31. A pneumatic spring according to claim 30, characterized in that said last mentioned means includes connection means for permitting an introduction of a pneumatic fluid to the respective partial volumes associated with the two roll bellows means.

32. A pneumatic spring according to claim 31, characterized in that said connection means includes separate supply conduits communicating with the respective partial volumes.

33. A pneumatic spring according to claim 32, characterized in that said connection means are disposed at one of the two supports.

34. A pneumatic spring according to claim 33, characterized in that the connection means is disposed at the casing.

35. A pneumatic spring according to claim 34, characterized in that the central fastening means includes a tube.

36. A pneumatic spring according to claim 35, characterized in that a guide rod means is displaceably guided in said tube, one of the two supports being operatively connected with said guide rod means and the other support being operatively connected with said tube.

37. A pneumatic spring according to claim 36, characterized in that the tube is formed by a casing tube of a vibration damper.

38. A pneumatic spring according to claim 37, characterized in that the two supports are located coaxially opposite one another.

39. A pneumatic spring according to claim 4, characterized in that a central fastening means is provided for connecting the spring piston means to each other, and in that the partition member is firmly supported with respect to the fastening means and the casing.

40. A pneumatic spring according to claim 39, characterized in that the central fastening means includes a tube.

41. A pneumatic spring according to claim 40, characterized in that a guide rod means is displaceably guided in said tube, one of the two supports being operatively connected with said guide rod means and the other support being operatively connected with said tube.

42. A pneumatic spring according to claim 1, characterized in that the casing includes at least two coaxial sleeve guide means each associated with a roll bellows means and a spring piston means.

43. A pneumatic spring according to claim 1, characterized in that means are provided for varying a supporting force and a counter-spring hardening of the pneumatic spring.

44. A pneumatic spring according to claim 1, characterized in that a tube is provided for connecting the spring piston means to each other.

45. A pneumatic spring according to claim 43, characterized in that a guide rod means is displaceably guided in said tube, one of the two supports being operatively connected with said guide rod means and the other support being operatively connected with said tube.

46. A pneumatic spring according to claim 45, characterized in that the tube forms a casing tube of a vibration damper.

47. A pneumatic spring according to claim 17, characterized in that at least one of the sleeve guide means flares conically outwardly over at least a portion of an axial length thereof in a direction toward the spring piston means associated therewith.

48. A pneumatic spring according to claim 19, characterized in that the two supports are located coaxially of one another.

49. A pneumatic spring according to claim 23, characterized in that the two supports are located coaxially of one another.

50. A pneumatic spring according to claim 25, characterized in that the two supports are located coaxially of one another.

51. A pneumatic spring according to claim 29, characterized in that the two supports are located coaxially of one another.

* * * * *